R. KROEDEL & C. F. SPEIDEL.
PHOTOGRAPHIC CAMERA BACK.
APPLICATION FILED MAR. 23, 1914.

1,144,140.

Patented June 22, 1915.
2 SHEETS—SHEET 1.

Witnesses
Walter B. Payne
Nelson H. Copp

Inventors
Robert Kroedel
Charles F. Speidel
By Church & Rich
Their Attorneys

R. KROEDEL & C. F. SPEIDEL.
PHOTOGRAPHIC CAMERA BACK.
APPLICATION FILED MAR. 23, 1914.
1,144,140.
Patented June 22, 1915.
2 SHEETS—SHEET 2.
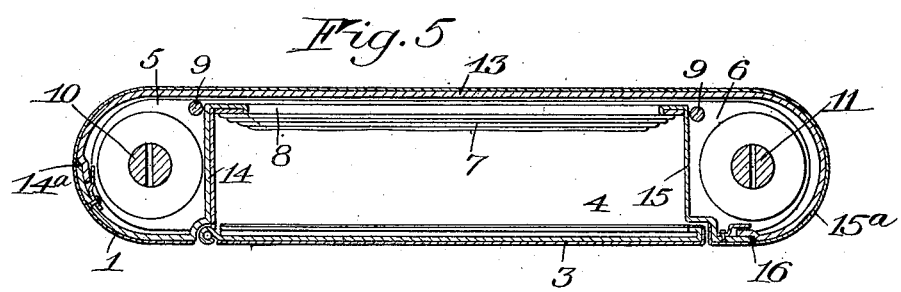
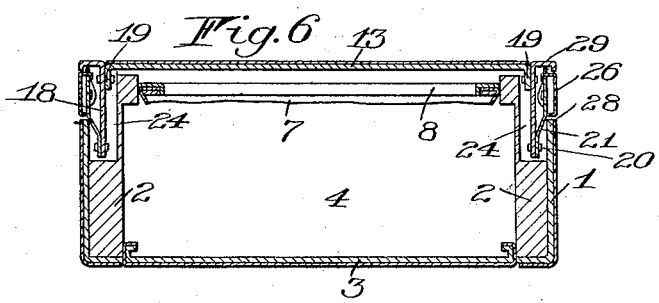
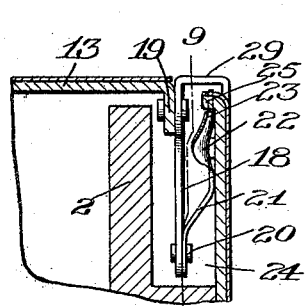
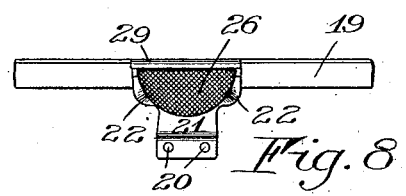
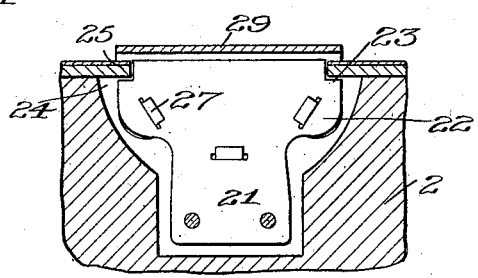
Witnesses
Walter B. Payne
Nelson H. Copp
Inventors
Robert Kroedel
Charles F. Speidel
By
Their Attorneys

UNITED STATES PATENT OFFICE.

ROBERT KROEDEL AND CHARLES F. SPEIDEL, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC-CAMERA BACK.

1,144,140.  Specification of Letters Patent.  Patented June 22, 1915.

Application filed March 23, 1914. Serial No. 826,793.

*To all whom it may concern:*

Be it known that we, ROBERT KROEDEL and CHARLES F. SPEIDEL, both of Rochester, in the county of Monroe and State of New York, have invented certain new and useful Improvements in Photographic - Camera Backs; and we do hereby declare the following to be a full, clear, and exact description of the same, reference being had to the accompanying drawings, forming a part of this specification, and to the reference-numerals marked thereon.

Our present invention relates to photography and more particularly to photographic cameras and it has for its object to provide a simple, cheap and convenient arrangement and adaptation of the camera body and its back whereby the film chambers and their contents are rendered more accessible for the easy insertion and removal of the film or film spools and the connection of the back is at the same time made more secure and proof against the entrance of light.

To these and other ends the invention consists in certain improvements and combinations of parts all as will be hereinafter more fully described, the novel features being pointed out in the claims at the end of the specification.

Figure 1:
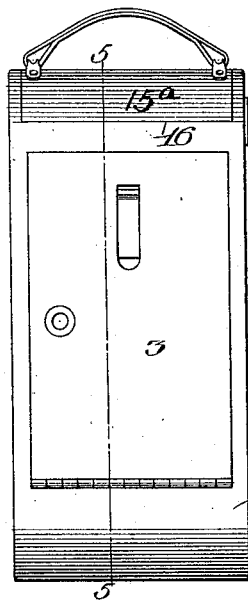
Figure 2:
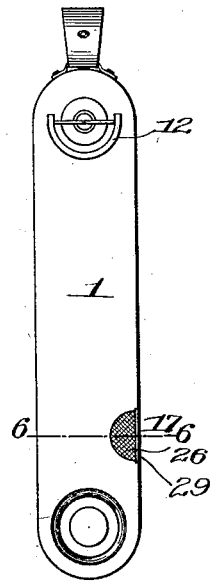
Figure 3:
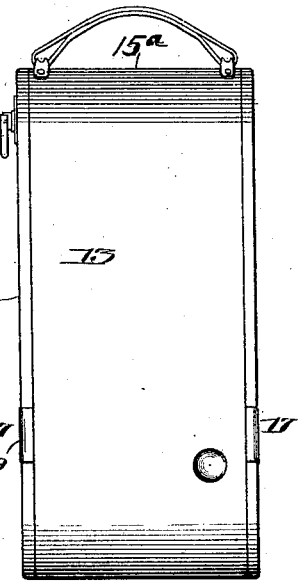
Figure 4:
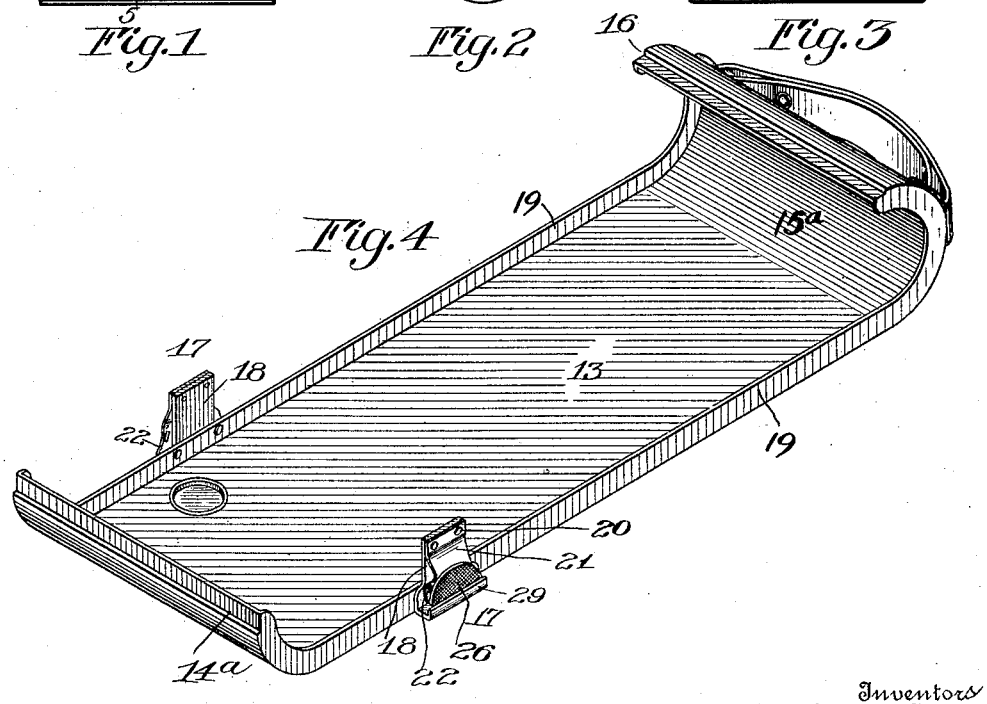

In the drawings: Figure 1 is a front elevation of a folding pocket camera constructed in accordance with and illustrating one embodiment of our invention, the same being shown in folded position; Fig. 2 is a side elevation thereof; Fig. 3 is a rear elevation thereof; Fig. 4 is a perspective view of the camera back viewed from its inner side; Fig. 5 is a central longitudinal section taken substantially on the line 5—5 of Fig. 1; Fig. 6 is a transverse section taken substantially on the line 6—6 of Fig. 2; Fig. 7 is an enlarged detail section of one of the back catches, as shown on a smaller scale in Fig. 6; Fig. 8 is an enlarged plan view of one of the back catches and adjacent portions of the back only, and Fig. 9 is a section taken substantially on the line 9—9 of Fig. 7.

Similar reference numerals in the several figures indicate the same parts.

Our present invention is applicable to the substantially flat roll holding cameras familiarly known as folding pocket cameras in which film chambers are arranged at the ends on opposite sides of a central bellows chamber within which the lens carrying front together with the bellows are accommodated when the camera is folded. A door closing this chamber in the latter position forms, when extended, a bed for the support of the front as it and the bellows are brought out to focusing position. Referring more particularly to the drawings in which such a camera is shown, 1 indicates the leather covered body or box preferably composed of a metallic shell having relatively heavy wooden reinforcements 2 at the top and bottom; 3 indicates the door and bed closing the chamber 4; 5 and 6 the film feeding and winding chambers, respectively and 7 the bellows, the front to which the latter is connected being omitted. The film is fed over a track at the rear and past the exposure opening 8 adjacent to which are the rollers 9 from the charged or supply spool 10 to the winding or take-up spool 11 which is manipulated by the usual winding key 12 on the exterior of the camera. The open rear side of the body is closed by a back 13 which may also be constituted by a metal plate formed up to the required shape as clearly shown in Fig. 4.

In the practice of our invention the inner walls 14 and 15 of the film chambers 5 and 6 (see Fig. 5) are formed by the walls of the bellows chamber 4. The front wall and part of the end or outer wall of the supply chamber 5 is formed by the body shell 1 which is preferably curved rearward while the remainder of the end wall and the back wall of the same chamber is formed by the end of the back 13 that is curved forwardly and meets the shell in the overlapping or light tight joint 14$^a$. The curved character of these walls is for the purpose of providing rounded ends on the camera as is usual with folding pocket cameras of the present type.

The winding or take-up film chamber 6 is constituted differently to the extent that the shell 1 forms only a small portion of the front wall thereof while the greater portion as well as all of the end and the back walls are formed by a semi-circular portion 15$^a$ of the back 13 which is curved forwardly and inwardly and meets the edge of the shell in a light tight overlapped joint 16. The back is applied by first engaging the semi-circular end 15$^a$ at 16 by an endwise movement substantially in the direction of the plane thereof followed by a transverse movement on the joint 16 as a center by which the parts are rocked into engagement at 14ᵃ at the opposite end. Catches 17, that will be later described in detail, carried by the back 13 near the end 14ᵃ interlock with the body to hold the back in place generally but more particularly to hold the joint 14ᵃ tightly together.

It will be seen from the foregoing that the following advantages flow from the arrangements stated; the winding film spool 11 which is not only the one that must be manipulated in threading the advance end of the film in the first instance but, unlike the other, is the one which is inserted when empty and removed when so full as to practically fill its chamber, is exposed and rendered accessible for manipulation from three sides upon removal of the back and may be readily grasped by the fingers; the joint at 16 is on that side of the spool where the film becomes sealed by its protective covering as it lies closely wound against the spool or an inner convolution and where the possible entrance of light can do the least damage about the circumference of the roll; such joint is rendered more positive due to the general disposition of the parts and the direction of movement necessary to its disengagement, and the other joint 14ᵃ, by reason of the close proximity of the catches 17 is also rendered more secure. These catches 17 preferably comprise in each instance a rigid plate 18 secured to one of the light excluding flanges 19 at its outer end and having connected thereto at its inner end at 20 a resilient plate 21 having cam wings 22 provided with shoulders 23. Both plates occupy a recess 24 in the body formed, in the present instance, in one of the wooden reinforcements 2 and the shoulders 22 engage behind inwardly turned flanges 25 of the shell 1. The cam wings 22 engage the flange and displace the resilient plate upon insertion until the shoulders 23 can snap into engagement. An offset finger portion 26 secured to the plate 21 by ears 27 lies flush in a cutaway portion 28 of the shell 1. By pressing on this finger portion the resilient plate is depressed and the shoulders 23 disengaged. A rigid guard flange 29 on the supporting plate 18, however, extends outwardly flush with the normal or engaging position of the finger portion to protect it against actuation from pressure other than such as that intentionally communicated by the fingers and to afford a rigid grip for the fingers in pulling the back outwardly away from the camera.

We claim as our invention:

1. In a photographic camera, the combination with the camera box or body having an exposure chamber and film chambers at opposite ends thereof, of a one-piece detachable back adapted to entirely close the exposure chamber and both film chambers and having one end extended forwardly around the end of the body and forming an interlocking joint with the latter at the front of the body.

2. In a photographic camera, the combination with the camera box or body, of a back having one end extended forwardly around the end of the body and forming an interlocking joint with the latter at the front of the body, said back being adapted to be disengaged from the body by a combined rotative movement transverse to its plane and an endwise movement substantially parallel with its plane.

3. In a photographic camera, the combination with the camera box or body, of a back having one end extended forwardly around the end of the body and forming an interlocking joint with the latter at the front of the body, said back being adapted to be disengaged from the body by a combined rotative movement transverse to its plane and an endwise movement substantially parallel with its plane, and a catch for detachably locking the body and back together arranged near the other end of the latter.

4. In a photographic roll holding camera, the combination with the camera body having an exposure chamber and film chambers at opposite ends thereof, of a one-piece separable back adapted to entirely close the exposure chamber and both film chambers and having a forwardly extended end portion constituting the front, end and back walls of one of the film chambers.

5. In a photographic camera, the combination with the camera body comprising a metallic shell having an inwardly turned marginal flange at the back edge of the camera, said flange being provided with a cutaway portion and the shell with an adjacent recess, of a separable back carrying a catch embodying a rigid plate and a resilient plate attached thereto and adapted, when deflected, to enter the body beyond the flange, the resilient plate having a shoulder adapted to engage behind the flange when released and being further provided with a finger portion occupying the recess in the shell, and the rigid plate being provided with a protecting flange extending outwardly flush with the normal locking position of the finger portion of the resilient plate.

ROBERT KROEDEL.
CHARLES F. SPEIDEL.

Witnesses:
HENRY L. THAYER,
JOHN A. ROBERTSON.

Copies of this patent may be obtained for five cents each, by addressing the "Commissioner of Patents, Washington, D. C."